C. F. SCHULTIS.
PLUG VALVE.
APPLICATION FILED MAY 25, 1918.
1,324,984.
Patented Dec. 16, 1919.
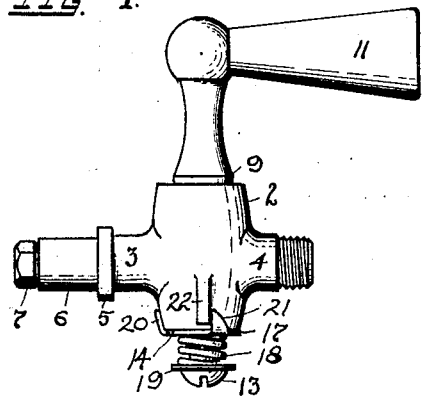
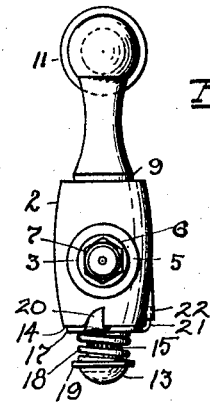
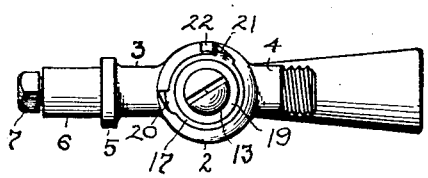
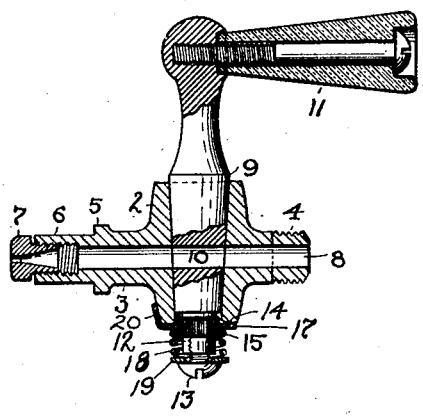
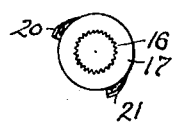
Inventor
C. F. Schultis
Witness
Geo. E. Kricker.
By Fisher + ???
Attorneys

UNITED STATES PATENT OFFICE.

CHARLES F. SCHULTIS, OF CLEVELAND, OHIO, ASSIGNOR TO UNITED BRASS MANUFACTURING COMPANY, OF CLEVELAND, OHIO, A PARTNERSHIP COMPOSED OF WM. J. SCHOENBERGER AND BENJAMIN F. KLEIN.

PLUG-VALVE.

1,324,984.  Specification of Letters Patent.  Patented Dec. 16, 1919.

Application filed May 25, 1918. Serial No. 236,600.

*To all whom it may concern:*

Be it known that CHARLES F. SCHULTIS, citizen of the United States, residing at Cleveland, in the county of Cuyahoga and State of Ohio, has invented certain new and useful Improvements in Plug-Valves, of which the following is a specification.

This invention relates to plug valves, and comprises the improvement hereinafter shown and described involving a very simple and inexpensive means of limiting the rotation of the valve plug and fastening the same upon the valve body.

The valve is especially designed for use with gas burners and stoves and adapted to open and close with a short turning movement, and as constructed it can be made at a considerable less cost and expense than similar valves on the market and more easily and accurately assembled.

In the accompanying drawings, Figure 1 is a side view of the valve embodying my improvement, and Fig. 2 is a view of the same valve looking inward from the left of Fig. 1. Fig. 3 is a bottom plan view of the valve. Fig. 4 is a sectional view of the valve. Figs. 5 and 6 are side and plan views, respectively, of the locking and stop member for the valve plug.

The valve comprises a cast metal body 2 of barrel shape having integral bosses or extensions 3 and 4, respectively, on opposite sides thereof. Extension 3 has an enlargement or collar 5 and a reduced extremity 6 which is screw-threaded internally to receive a gas nipple 7. Extension 4 on the opposite side of the body is screw-threaded externally to permit its attachment to a gas supply pipe, and a central bore or gas passage 8 in said extensions is adapted to be closed or opened by a tapered valve plug 9 seated in an opening of corresponding taper in body 2. As shown, valve plug 9 is adapted to be turned approximately 90 degrees to bring its transverse gas passage 10 into open or closed communication with the bore 8, but the movement may be less than a quarter turn, and in fact the users of such valves frequently call for plugs having less than a 90 degree turn. To meet such varied demands without modifying the plug body or the plug, I have devised a simple means of securing the tapered plug in gas-tight seating position within the body while affording a definite stop limit to this rotation, and whereby an adjustable setting may also be obtained of the valve plug and its opening 10 relatively to the body and the bore 8.

Thus, the valve plug 9 has a suitable handle 11 at its upper end wherewith to turn the plug, and the plug is also made with a reduced extremity 12 at its lower end, which is provided with a tapped opening to receive a fastening screw 13. Extremity 12 projects a short distance below the flat face 14 of the bottom end of body 2 and is provided with adjustable interlocking means, preferably with a band of fine serrations 15 which are of sufficient length to extend partly within the body, as well as some distance beyond or beneath flat face 14. In this way the said serrations may be engaged by corresponding interlocking means or serrations 16 formed at the inner edge of a flat ring 17 which is adapted to bear against flat face 14 and to be held in rotatable engagement therewith by a short spiral spring 18 interposed between ring 17 and a small washer 19 secured between the head of screw 13 and the outer end of extremity 12. The spring holds the tapered valve tightly to its tapered seat notwithstanding that the ring 17 rotates with the valve plug, because the serrated engagement between the ring and the plug is sufficiently free or loose to accommodate a slidable movement or longitudinal play of the ring 17 relatively to the plug.

The limit of rotation of the plug is determined by two lugs 20 and 21 which are formed at the outer edge of ring 17 when the ring is stamped from a blank, and these lugs are bent at an angle to the face of the ring and slightly inclined in respect thereto to conform to the bilge shape of body 2. Thus when ring 17 is engaged with the body its lugs 20 and 21 have a rotatable movement at the side of the body and are adapted to alternately engage a single lug 22 cast integral with the body on the transverse median line and at one side thereof near its bottom end. The lugs 20 and 21 may be spaced different distances apart, but with a ring such as shown a quarter revolution of the plug is the limit of turn to open and close the valve. For a turn of less degree a different setting is required, and the only change to meet a demand for such a valve would be to assemble the valve parts with a ring having the lugs 20 and 21 placed in nearer relation. Serrations or their equivalent permit the ring to be adjustably fixed to the plug so that the lugs may be placed in different radial positions relatively to the axis of the gas opening 10 and likewise relatively to the handle 11. Thus it is possible to adjust and set the stop ring on the plug so that the plug may be placed in a cut-off position when either lug 20 and 21 is engaged with the stop lug 22, and only in an open position when the stop lug 22 is at an intermediate point, say midway of the two lugs on ring 17. The serrated ring and plug are also of aid in quickly and correctly assembling the parts.

What I claim is:

1. A valve comprising a body having stop means at its side, a rotatable valve plug seated within said body having a reduced extremity exposed at one end of said body, a flat ring sleeved upon said plug extremity and bearing against said body and having stop means bent substantially parallel with the side of said body and adapted to engage its stop means, and means for detachably locking said flat ring directly to said extremity with an axial and rotary adjustment relatively to said body and valve plug.

2. A valve comprising a rotatable plug provided with serrations, a body provided with a stop lug at its side, a serrated ring engaged with the serrations of said plug, and said ring having lugs bent to lie in the same plane as the side of said body and adapted to engage the lug on said body.

3. A valve comprising a body having a stop lug at its side, a rotatable valve plug seated within said body having a serrated extremity, a screw engaged with said extremity, a ring engaged with said serrations and bearing against said body and having lugs adapted to engage said stop lug, and a spring interposed between said ring and screw.

4. A valve as described comprising a cast metal body having a stop lug cast at the side thereof, a tapered valve plug having a gas passage and provided with a reduced extension having serrations longitudinally thereof and exposed beyond the said body, a flat ring having an inner serrated edge slidably engaged with the serrated portion of said plug and provided with lugs bent at an angle to the plane of said flat ring and lying adjacent the side of said body and adapted to engage the said stop lug, a screw engaged with the end of said plug extension, a washer held in place upon the extension by said screw, and a spiral spring sleeved upon said extension and bearing against said washer and said ring.

Signed at Cleveland, in the county of Cuyahoga, and State of Ohio, this 14th day of May, 1918.

CHARLES F. SCHULTIS.